United States Patent Office 3,449,335
Patented June 10, 1969

3,449,335
MEROCYANINE DYES CONTAINING THE
CARBOSTYRIL NUCLEUS
Ralph A. Copeland, Binghamton, N.Y., assignor to GAF
Corporation, New York, N.Y., a corporation of
Delaware
No Drawing. Filed Jan. 3, 1966, Ser. No. 517,942
Int. Cl. C09b 23/10; C07d 99/06
U.S. Cl. 260—240.4      5 Claims

ABSTRACT OF THE DISCLOSURE

A merocyanine dye corresponding to the following general formula:

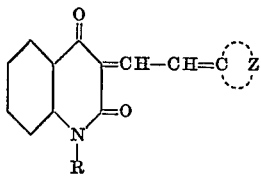

wherein R is selected from the class consisting of H and $CH_3$, and Z represents the atoms necessary to complete a heterocyclic radical selected from the class consisting of 5,6-dimethyl-3-ethyl-benzoxazolyl-2, 3-(2'-carboxyethyl)-5-chloro-benzothiazolyl-2- and 1-benzylquinolyl-4.

---

This invention relates to novel dyes of the merocyanine series. More particularly, this invention relates to cyanine dyes prepared from 4-hydroxy carbostyril compounds.

Various dyes of the merocyanine series are known and have been used as photosensitizers. I have found a new class of merocyanine dyes which have outstanding properties for use in photography.

It is an object of this invention to provide novel dyes of the merocyanine series containing a carbostyril nucleus.

It is a further object of this invention to prepare novel dyes of the merocyanine series from 4-hydroxy carbostyril compounds.

Other objects and advantages of this invention will appear from the detailed description thereof given below.

Examples of the carbostyril compounds which may be used in the preparation of my novel dyes are

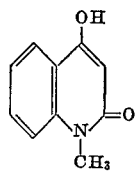 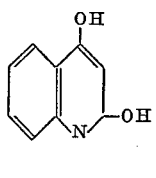 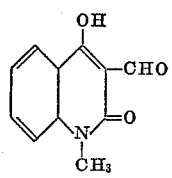

| I | II | III |
|---|---|---|
| 4-hydroxy-1-methyl carbostyril | 2,4-dihydroxy quinoline (2,4-quinolinediol) | 4-hydroxy-1.methyl 3-formyl-carbostyril |

These are known compounds and were prepared by known methods. Condensations of Compounds I and II may be carried out with active acetanilido vinyl compounds in the presence of basic catalysts to produce dyes of varying adsorption characteristics. (Compound II may be considered as the enol form of 4-hydroxy carbostyril.)

Compound III reacts with active methylene groups directly. Thus, Compound III and 2,5,6-trimethyl benzoxazole ethiodide produced the same dye as Compound I and 2-(acetanilidovinyl) - 5,6 - dimethyl benzoxazole ethiodide. These mero cyanine dyes may be in the form of their hydroiodide salts.

A series of dyes were prepared using these compounds. These dyes have the following structure:

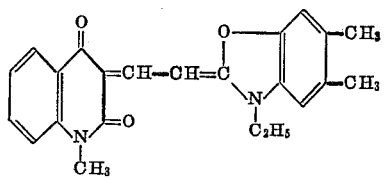

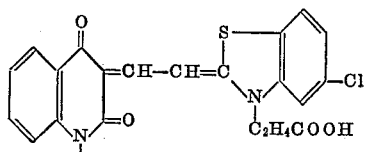

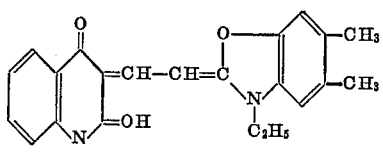

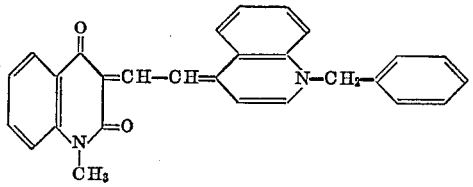

The following examples of the methods of preparing the novel dyes of this invention are given. It is to be understood, however, that these examples are given by way of illustration and not by way of limitation.

EXAMPLE I

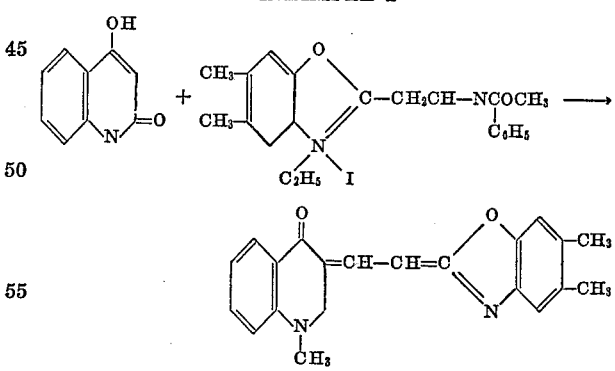

0.88 (.005 mol) of 1-methyl-4-hydroxy carbostyril and 2.31 grams (.005 mol) of 2-acetanilidovinyl-5,6-dimethyl benzoxazole ethiodide were added to 10 ml. of methanol. Triethylamine (1 ml.) were added. On heating on a steam bath, all dissolved and an orange-yellow solution formed. On continued heating a yellow crystalline product separated.

The mixture was cooled to room temperature and the crystalline filtered off. Washed with methanol. This dye, after crystallization from methanol, had a sharp absorption peak ($CH_3OH$) at 471 m$\mu$ and a secondary peak at 448 m$\mu$.

EXAMPLE II

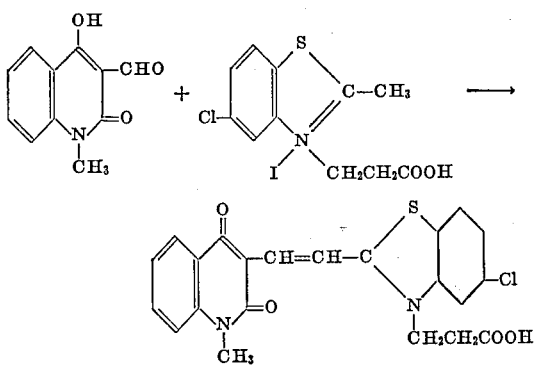

0.51 gram (0.0025 mol) of 1-methyl-3-formyl-4-hydroxy carbostyril and 0.93 gram of 2-methyl-5-chlorobenzothiazole carboxyethyl iodide were added to a 10 ml. of methanol. Piperidine (1 ml.) was added and the mixture heated to boiling on the steam bath. A deep red solution formed. After 15 minutes, the solution was filtered and cooled to room temperature. Addition of glacial acetic acid precipitated the red product. This solid was filtered off, washed with methanol and crystallized from dimethyl formamide. Orange-red needles separated. Absorption maximum (CH$_3$OH) 505 m$\mu$ with an inflection point at 480 m$\mu$.

EXAMPLE III

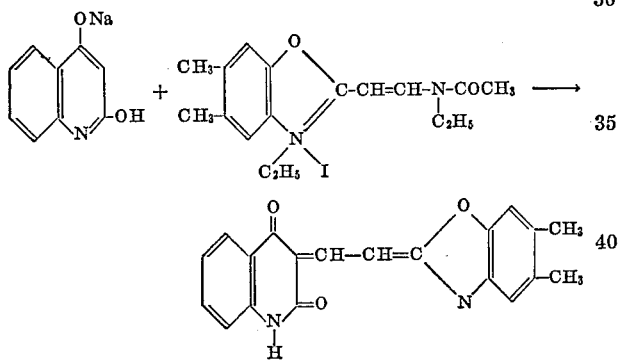

To 0.46 gram (0.0025 mol) of 2,4-dihydroxy quinoline monosodio salt and 1.16 grams (0.0025 mol) of 2-acetanilinovinyl-5,6-dimethyl benzoxazole ethiodide in 10 ml. of methanol was added 1 ml. of triethylamine. On boiling, all dissolved to give a deep yellow-orange solution. On continued heating, a yellow crystalline dye separated. This was filtered off and triturated twice with methanol. Maximum absorption 469 m$\mu$ with secondary peak at 447 m$\mu$.

The same dye was made using pyridine alone as solvent (no triethylamine).

EXAMPLE IV

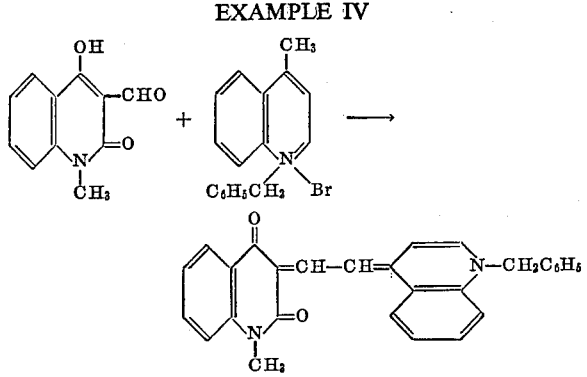

To 0.51 gram (0.0025 mol) of 1-methyl-3-formyl-4-hydroxy carbostyril and 0.79 gram (0.0025 mol) of 4-methylquinoline benzylbromide in 10 ml. of methanol was added 1 ml. of piperidine and the mixture refluxed for 10 minutes. On cooling, the product washed with ether and recrystallized from methanol. Maximum absorption 558 m$\mu$.

The dyes produced as described above are of use primarily as sensitizing dyes. However, by the proper choice of a secondary nucleus, the carbostyril nuclei may be made to yield desensitizing or filter dyes.

Modifications may be resorted to within the scope of the appended claims.

I claim:
1. The merocyanine dye having the following formula

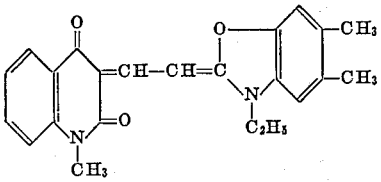

2. The merocyanine dye having the following formula

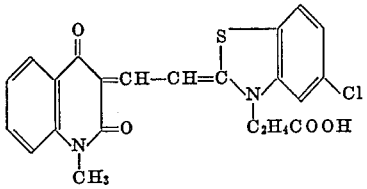

3. The merocyanine dye having the following formula

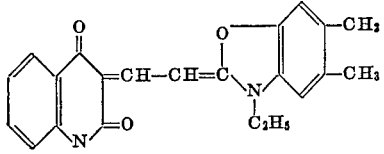

4. The merocyanine dye having the following formula

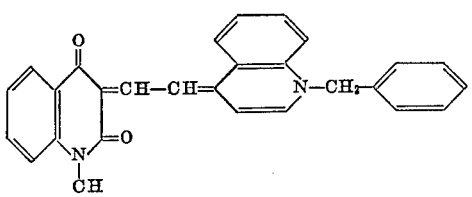

5. The merocyanine dye corresponding to the following general formula:

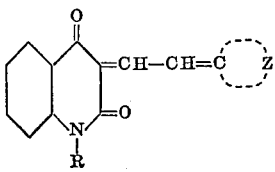

wherein R is selected from the class consisting of H and CH$_3$, and Z represents the atoms necessary to complete a heterocyclic radical selected from the class consisting of 5,6-dimethyl-3-ethyl-benzoxazolyl-2, 3-(2'-carboxyethyl)-5-chloro-benzothiazolyl-2 and 1-benzylquinolyl-4.

References Cited
UNITED STATES PATENTS 2,689,849   9/1954   Brooker _____ 260—240.6

JOHN D. RANDOLPH, *Primary Examiner.*

U.S. Cl. X.R.

96—106; 260—240.8, 307, 289